(12) United States Patent
Jones

(10) Patent No.: US 11,638,916 B1
(45) Date of Patent: May 2, 2023

(54) ION LITHIUM EXTRACTION APPARATUS

(71) Applicant: Clayton McMonigle Jones, Palm Springs, CA (US)

(72) Inventor: Clayton McMonigle Jones, Palm Springs, CA (US)

( * ) Notice: Subject to any disclaimer, the term of this patent is extended or adjusted under 35 U.S.C. 154(b) by 0 days.

(21) Appl. No.: 17/959,086

(22) Filed: Oct. 3, 2022

Related U.S. Application Data

(63) Continuation of application No. PCT/US2022/029643, filed on May 17, 2022.

(60) Provisional application No. 63/287,689, filed on Dec. 9, 2021, provisional application No. 63/282,031, filed on Nov. 22, 2021.

(51) Int. Cl.
| | |
|---|---|
| *B01J 47/06* | (2006.01) |
| *B01J 39/04* | (2017.01) |
| *B01J 39/02* | (2006.01) |
| *B01J 39/20* | (2006.01) |
| *B01J 39/10* | (2006.01) |
| *C02F 1/42* | (2023.01) |
| *C02F 1/48* | (2023.01) |
| *C02F 1/00* | (2023.01) |
| *C01D 15/00* | (2006.01) |
| *C02F 101/10* | (2006.01) |

(52) U.S. Cl.
CPC ............... *B01J 47/06* (2013.01); *B01J 39/02* (2013.01); *B01J 39/04* (2013.01); *B01J 39/10* (2013.01); *B01J 39/20* (2013.01); *C01D 15/00* (2013.01); *C02F 1/008* (2013.01); *C02F 1/42* (2013.01); *C02F 1/485* (2013.01); *C02F 2001/425* (2013.01); *C02F 2101/10* (2013.01)

(58) Field of Classification Search
None
See application file for complete search history.

(56) References Cited

U.S. PATENT DOCUMENTS

| | | | |
|---|---|---|---|
| 4,247,987 A | 2/1981 | Coulaloglou et al. | |
| 4,283,204 A | 8/1981 | Savage | |
| | | (Continued) | |

OTHER PUBLICATIONS

Bousseksou et al. "Switching of Molecular Spin States in Inorganic Complexes by Temperature, Pressure, Magnetic Field and Light: Towards Molecular Devices" Eur. J. Inorg. Chem, vol. 2004, Issue22, Nov. 2004, pp. 4353-4369; entire document, especially p. 4354, p. 4357 [online] <https://chemistry-europe.onlinelibrary.wiley.com/doi/abs/10.1002/ejic.200400571>.

*Primary Examiner* — Chester T Barry
(74) *Attorney, Agent, or Firm* — Kirk A. Buhler; Buhler & Associates Patenting

(57) ABSTRACT

Improvements in a lithium-ion extraction apparatus to extract lithium-ion from water and more specifically salt or brine water. The extraction of lithium-ion utilizing electromagnetic separation into a sorbent shortens the extraction time and minimizes environmental impact. The sorbent is typically a polymer that is in solution with the brine where direct contact with the brine water with the sorbent extracts lithium-ions. The fixed and magnetic field magnetic field increases the absorption in the sorbent by energizing the sorbent. The sorbent is in the form of porous beads that have selective lithium-ion affinity in a continuous solid-phase extraction process. The lithium-ion extraction apparatus includes fluid flow, agitation, pressure, and temperature control of the brine solution. The flow rate alters and controls the dwell time that the brine solution is in proximity to the electromagnets.

14 Claims, 5 Drawing Sheets

(56) References Cited

U.S. PATENT DOCUMENTS

| | | |
|---|---|---|
| 5,522,996 A | 6/1996 | Brownstein et al. |
| 9,556,294 B2 | 1/2017 | Hanson et al. |
| 10,596,488 B1 | 3/2020 | Martin et al. |
| 2015/0001155 A1 | 1/2015 | Johnson |
| 2016/0045841 A1 | 2/2016 | Kaplan et al. |
| 2019/0389935 A1 | 12/2019 | Watters et al. |

ION LITHIUM EXTRACTION APPARATUS

CROSS REFERENCE TO RELATED APPLICATIONS

This application claims priority to International Patent Cooperative Treaty (PCT) application PCT/US2022/029643 filed on May 17, 2022, that claims the benefit of Provisional Application 63/287,689 filed Dec. 9, 2021, and Provisional Application 63/282,031 filed Nov. 22, 2021, the entire contents of which is hereby expressly incorporated by reference herein.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

Field of the Invention

This invention relates to improvements in extraction of lithium-ion from water. More particularly, the present improved lithium-ion extraction apparatus uses electromagnetic fields to increase the extraction of lithium-ion from water.

Description of Related Art Including Information Disclosed Under 37 CFR 1.97 and 1.98.

The demand for lithium is outpacing the rate lithium is being mined from brines, due to continuing advancements in mobile devices and electric cars. Lithium is a scarce element. There are very few commercial resources where lithium is found in concentrations sufficient for producing useful lithium compounds. The primary sources of lithium are in brines from salars and salt lakes, and lithium-bearing spodumene ores, while geothermal brines represent the second most productive sources of lithium ion.

A number of patents and or publications have been made to address these issues. Exemplary examples of patents and or publication that try to address this/these problem(s) are identified and discussed below.

U.S. Pat Nos. 4,247,987 and 4,283,204 issued on Feb. 3, 2981 and Aug. 11, 1981, both for Exxon Research & Engineering Co. and titled Continuous countercurrent fluid-solids contacting process stabilized by a magnetic field and Process for the separation of contaminants from feed streams using magnetic beds respectively. These patents disclose a process for continuous countercurrent contacting with magnetically stabilized fluidized beds. More particularly, the invention relates to the operation of a magnetically stabilized bed with continuous solid addition and removal. The bed particles which include a magnetizable component are stabilized against gas by-passing and solids back-mixing during countercurrent contacting by the use of an applied magnetic field for carrying out separation processes to remove contaminants. The use of the applied magnetic field in such processes enables one to use small size fluidizable, adsorbent particles without encountering high pressure drops. The small adsorbent particles having a magnetic component give faster transfer of the sorbed species from the contacting fluid than with larger adsorbent particles which allows for a closer approach to equilibrium. While this process uses a magnetic field it is for removing contaminants and not for extracting lithium ion, it further uses a fixed electromagnetic field.

U.S. Pat. No. 5,522,996 issued on Jun. 4, 1996, to Sydney K. Brownstein et al., and is titled Removal of Lithium Ions from Aqueous Solutions. This patent discloses an agent capable of selectively binding lithium ions to form a lithium complex, employed in association with a biologically inert carrier or excipient. Typically, the agent is included in a novel graft polymer, such as a cross-linked polystyrene polymer. This invention may also be applied to sensing lithium-ion concentrations in aqueous solution and to the selective removal of lithium ions from an aqueous solution, including biological fluids. While this patent uses a carrier to bind with the lithium it does not use a magnetic field.

U.S. Pat. No. 10,596,488 issued on Mar. 24, 2020, to Dean F. Martin et al., and is titled Lithium-Ion Extraction Methods. This patent discloses compositions for non-aqueous lithium-ion extraction and methods of non-aqueous lithium-ion extraction. In some embodiments, Octolig® or a methyl derivative thereof can be used to extract lithium ion and/or other ions from a non-aqueous substrate. While this patent is for extraction of lithium ion, the extraction does not involve any hydrated liquid or more specifically extraction from salt water.

What is needed is lithium-ion extraction apparatus that flow an aqueous solution with lithium ion past fixed and/or variable electromagnets to extract the lithium ion in a polymer sorbent. The proposed improved lithium-ion extraction apparatus described in this document provides the solution.

BRIEF SUMMARY OF THE INVENTION

It is an object of the improved lithium-ion extraction apparatus to extract lithium-ion from water and more specifically salt or brine water. Much of the world's commercial lithium is still recovered today in the way it has been for half a century: by evaporating brines collected from salars and salt lakes in evaporation ponds. Recovering lithium in evaporation ponds can take a year or more and leaves behind lots of salt waste. The extraction of lithium-ion utilizing electromagnetic separation into a sorbent shortens the extraction time and minimizes environmental impact.

It is an object of the improved lithium-ion extraction apparatus to use a sorbent. The sorbent is typically a polymer that is in contact with the brine where direct contact with the brine water with the sorbent extracts lithium-ion. The fixed and/or magnetic field magnetic field increases the absorption in the sorbent by energizing the sorbent. The electromagnetic field can run parallel with the flow of the brine solution or can operate in rings around the brine flow. Energizing the rings can operate at the flow rate of the brine or can be energized in opposition to the flow direction and rate of the brine.

It is another object of the improved lithium-ion extraction apparatus where the sorbent is a polymer. The polymer can be a graft polymer, such as a cross-linked polystyrene polymer. The sorbent is in the form of porous beads that have selective lithium-ion affinity in a continuous solid-phase extraction process. Improvements in sorbent and polymers increase the efficiency of absorbing (extracting) the lithium-ion.

It is another object of the improved lithium-ion extraction apparatus to include fluid flow, agitation, and temperature control of the brine solution. The flow rate alters and controls the dwell time that the brine solution is in proximity to the electromagnets. The agitation further increases the amount of contact between the brine solution and the sorbent. The amount of time and the number of times the lithium-ion solution contacts the sorbent increases the amount of absorption. Temperature control can also alter the lithium-ion production where both the lithium-ion and the sorbent can be affected by temperature. Pressure within the chamber of brine and sorbent can alter the lithium-ion production where the sorbent can be squeezed and then released to change the size and surface area of the sorbent.

It is another object of the improved lithium-ion extraction apparatus to create a static magnetic field, at 0 Hz or direct current (DC) to create an induction effect when the sorbent moves inside the reaction chamber. This will create a charge in the sorbent making it more attractive to the lithium-ions.

It is still another object of the improved lithium-ion extraction apparatus to put the electrons in the sorbent into a higher energy state, to enlarge the orbit by adjusting the magnetic frequency at the resonance frequency of the orbiting electrons in the sorbent. Changing the magnetic field brings the orbiting electrons in and out of these states. When the orbiting electrons enter this elevated state, they gain photons. When they leave this elevated state, they lose photons. The gaining and lose of photons will assist in attracting the ions into the sorbent.

Various objects, features, aspects, and advantages of the present invention will become more apparent from the following detailed description of preferred embodiments of the invention, along with the accompanying drawings in which like numerals represent like components.

BRIEF DESCRIPTION OF THE SEVERAL VIEWS OF THE DRAWING(S)

DETAILED DESCRIPTION OF THE INVENTION

Figure 1:
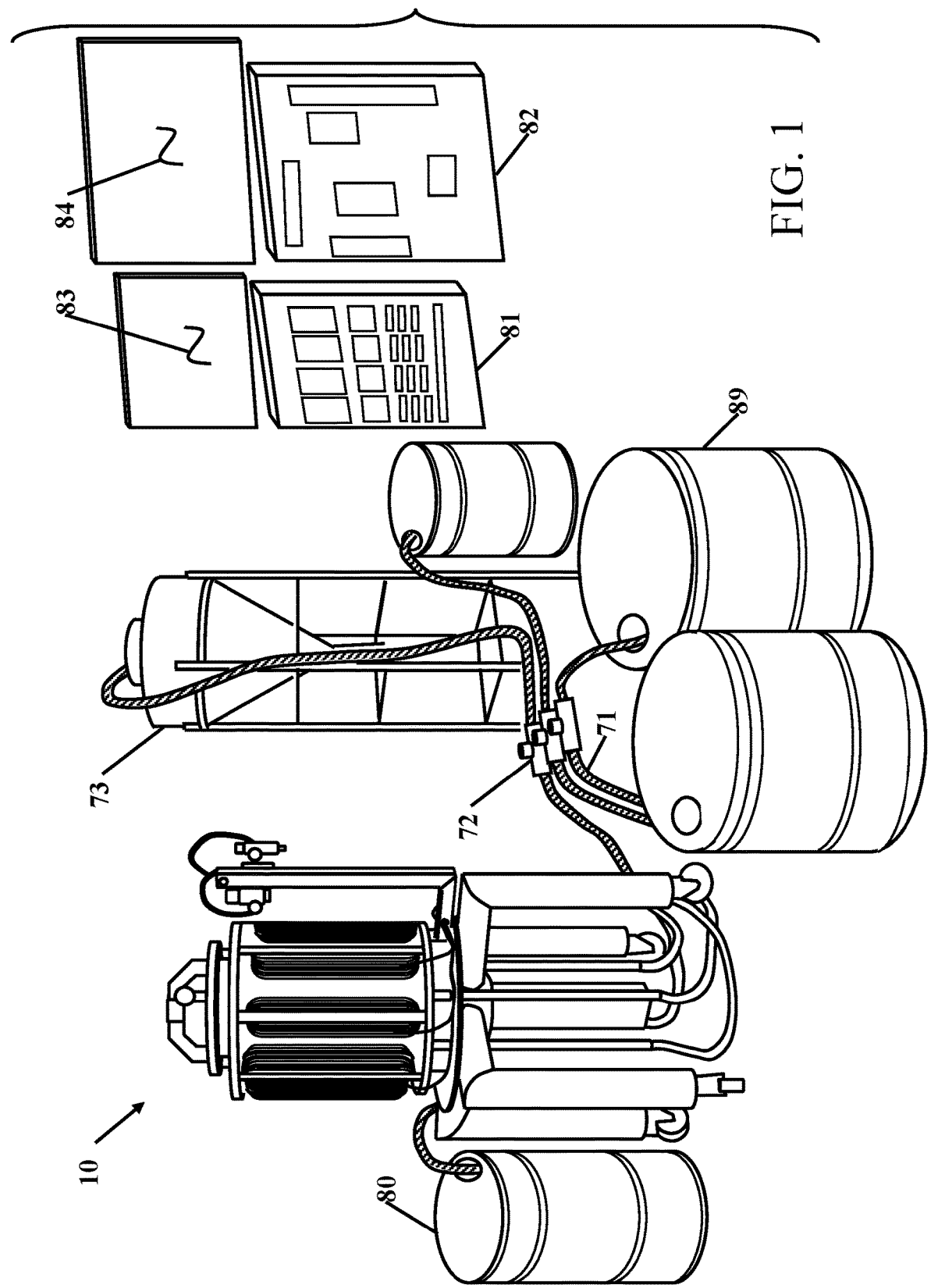
FIG. 1 shows a pictorial diagram of the components in the lithium-ion extractor.

It will be readily understood that the components of the present invention, as generally described and illustrated in the drawings herein, could be arranged and designed in a wide variety of different configurations. Thus, the following more detailed description of the embodiments of the system and method of the present invention, as represented in the drawings, is not intended to limit the scope of the invention but is merely representative of various embodiments of the invention. The illustrated embodiments of the invention will be best understood by reference to the drawings, wherein like parts are designated by like numerals throughout.

| Item Numbers and Description | | | |
|---|---|---|---|
| 10 | lithium-ion extractor | 20 | leg |
| 21 | caster | 22 | lower base |
| 23 | lower housing | 30 | flexible tubes |
| 31 | rigid tubes | 32 | upper tubes |
| 33 | out | 34 | gauge |
| 35 | top cover | 36 | top housing |
| 37 | regulator | 40 | extraction chamber |
| 41 | inner housing | 42-49 | coils |
| 50 | iron core | 52 | tank |
| 60 | mixing blade(s) | 70 | actuator |
| 71 | tube(s) | 72 | valves |
| 73 | funnel | 80 | barrel |
| 81 | relay(s) | 82 | controller |
| 83 | operation screen | 84 | controller screen |
| 85 | H bridge(s) | 95 | weak |
| 89 | barrel | 96 | outward |
| 97 | inward | 98 | rotation |
| 99 | oscillation | 110 | sensor(s) |
| 112 | keyboard/mouse | 114 | valve control |
| 115 | motor | 116 | actuator |
| 118 | pump | 120 | plug |
| 121 | transformer | | |

While this technology is susceptible of embodiment in many different forms, there is shown in the drawings and will herein be described in detail several specific embodiments with the understanding that the present disclosure is to be considered as an exemplification of the principles of the technology and is not intended to limit the technology to the embodiments illustrated. The terminology used herein is for the purpose of describing particular embodiments only and is not intended to be limiting of the technology. As used herein, the singular forms "a," "an," and "the" are intended to include the plural forms as well, unless the context clearly indicates otherwise.

It will be further understood that the terms "comprises," "comprising," "includes," and/or "including," when used in this specification, specify the presence of stated features, integers, steps, operations, elements, and/or components, but do not preclude the presence or addition of one or more other features, integers, steps, operations, elements, components, and/or groups thereof. It will be understood that like or analogous elements and/or components, referred to herein, may be identified throughout the drawings with like reference characters.

To extract lithium-ion from brine, the brine must be combined with a sorbents or sorbent beads or grains to absorb the lithium-ion from the brine. The lithium-ion enriched sorbent can then be processed to remove the lithium-ion from the sorbent. Inorganic ion exchange sorbents, such as lithium manganese oxides, spinel lithium titanium oxides, and lithium aluminum layered double hydroxide chloride, have been shown to have high lithium-ion selective uptake capacity. However, the recovery process requires the lithium-ion to be in contact with these sorbents for long periods of time. The lithium-ion extractor in this document uses electromagnets to energize the sorbent to absorb the lithium-ion into the sorbents and to accelerate recovery of the lithium-ions from the sorbents.

Lithium selective ion exchange sorbents are a promising alternative for extracting lithium-ion from brines. Inorganic ion exchange sorbents, such as lithium manganese oxides, spinel lithium titanium oxides, and lithium aluminum layered double hydroxide chloride, have been shown to have high lithium-selective uptake capacity. FIG. 1 shows a pictorial diagram of the components in the lithium-ion extractor 10. In this figure there is a barrel 80 where brine, salt water or other fluid or gas that contains lithium-ion. The term "brine" is used throughout this application but could indicate any fluid or gas. The pH values of the brines have a solution from pH 4 up to pH 8. The brine is combined with a sorbent material to make a combined brine/sorbent and can be funneled 73 into other barrel(s).

The sorbent is in the form of porous beads, grains, or rice and typically with a minimum size of 150 micron. The sorbent is a polymer. The polymer can be a graft polymer, such as a cross-linked polystyrene polymer. Flow to/from the tube(s) 71 is controlled with a valve 72. The brine/sorbent is the pumped into or through the lithium-ion extractor 10.

Further and detailed description of the lithium-ion extractor 10 is shown and described in other figures herein. A controller 82 controls relays 81 and H-bridge power supplies. The flow and operation of the lithium-ion extractor 10 can be viewed on the operation screen 83 and the control screen 84. While the brine/sorbent passes through the lithium-ion extractor 10 sorbent is energized and absorbs lithium-ions from the brine and into the sorbent. After the brine/sorbent passes through or has remained in the lithium-ion extractor 10 for a sufficient period of time the brine/sorbent is drained or pumped out of the lithium-ion extractor 10 into a barrel 89 for future recovery of the lithium-ion. Recovery is usually from washing the sorbent, but other methods can be utilized.

Figure 2:
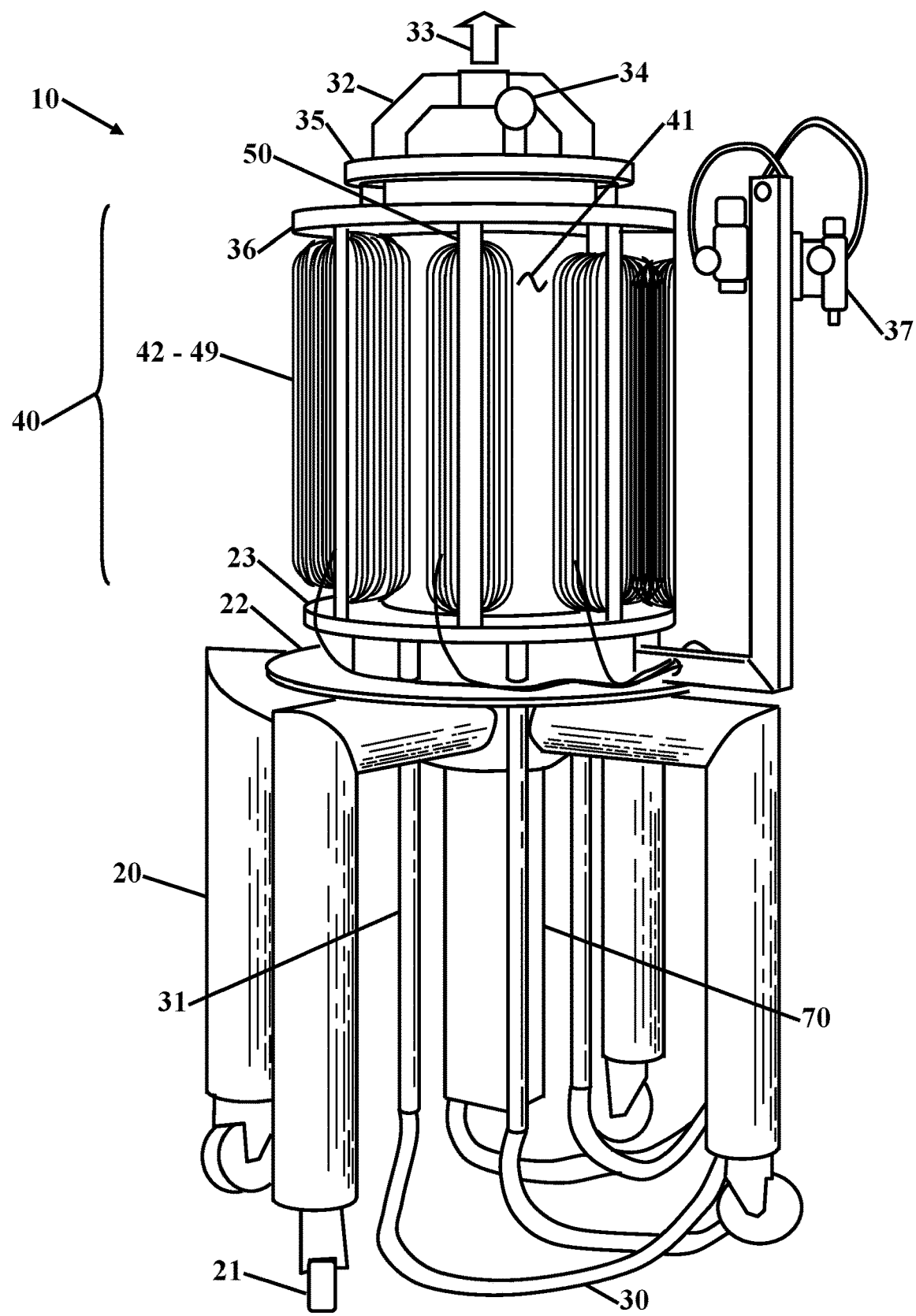
FIG. 2 shows a perspective view of the lithium-ion extractor.

FIG. 2 shows a perspective view of the lithium-ion extractor 10. In this figure the lithium-ion extractor 10 has a base constructed with legs 20 on casters 21 so the lithium-ion extractor 10 can be moved. At the underside of the lithium-ion extractor 10 is an actuator 70. The brine/sorbent is transferred into the lithium-ion extractor 10 using flexible tubes 30 that pass into rigid tubes 31. The transfer of brine/sorbent into and out of the lithium-ion extractor 10 can be from the bottom or the top of the lithium-ion extractor 10. The central portion of the lithium-ion extractor 10 is the extraction chamber 40.

The extraction chamber 40 sits on top of a lower housing 23 on a lower base 22. Within the extraction chamber 40 is an inner housing 41 that is surrounded by a plurality of coils 42-49 wrapped around iron core(s) 50. This figure shows 8 coils 42-49 but more or less than 8 coils 42-49 are contemplated based upon the desired performance of the extraction chamber 40 to extract/absorb lithium-ion into sorbent. The operation of the coils to extract lithium-ion is shown and described in other figures herein. The top of the extraction chamber 40 has a top housing 36 and a top cover 35. Upper tube(s) 32 allows brine/sorbent to enter or be extracted 33 from the extraction chamber 40. The top of the extraction chamber 40 is further shown with a pressure gauge 34 and one or more pressure regulator(s) 37.

The electro-magnetic frequency puts the electrons in the sorbent into a higher energy state, thus enlarging the orbit at (or near) the resonance frequency of the orbiting electrons in the sorbent. Change of the orbit type of the orbiting electrons in the sorbent increases the absorption of the lithium-ion into the sorbent. The electro-magnetic pulsing action brings the orbiting electrons in and out of these states. When the orbiting electrons enter this excited state, they gain photons. When they leave this elevated state, they lose photons. The gain and lose of photons assist in attracting the lithium-ions in the brine that make the sorbent more attractive to the lithium-ions.

Figure 3:
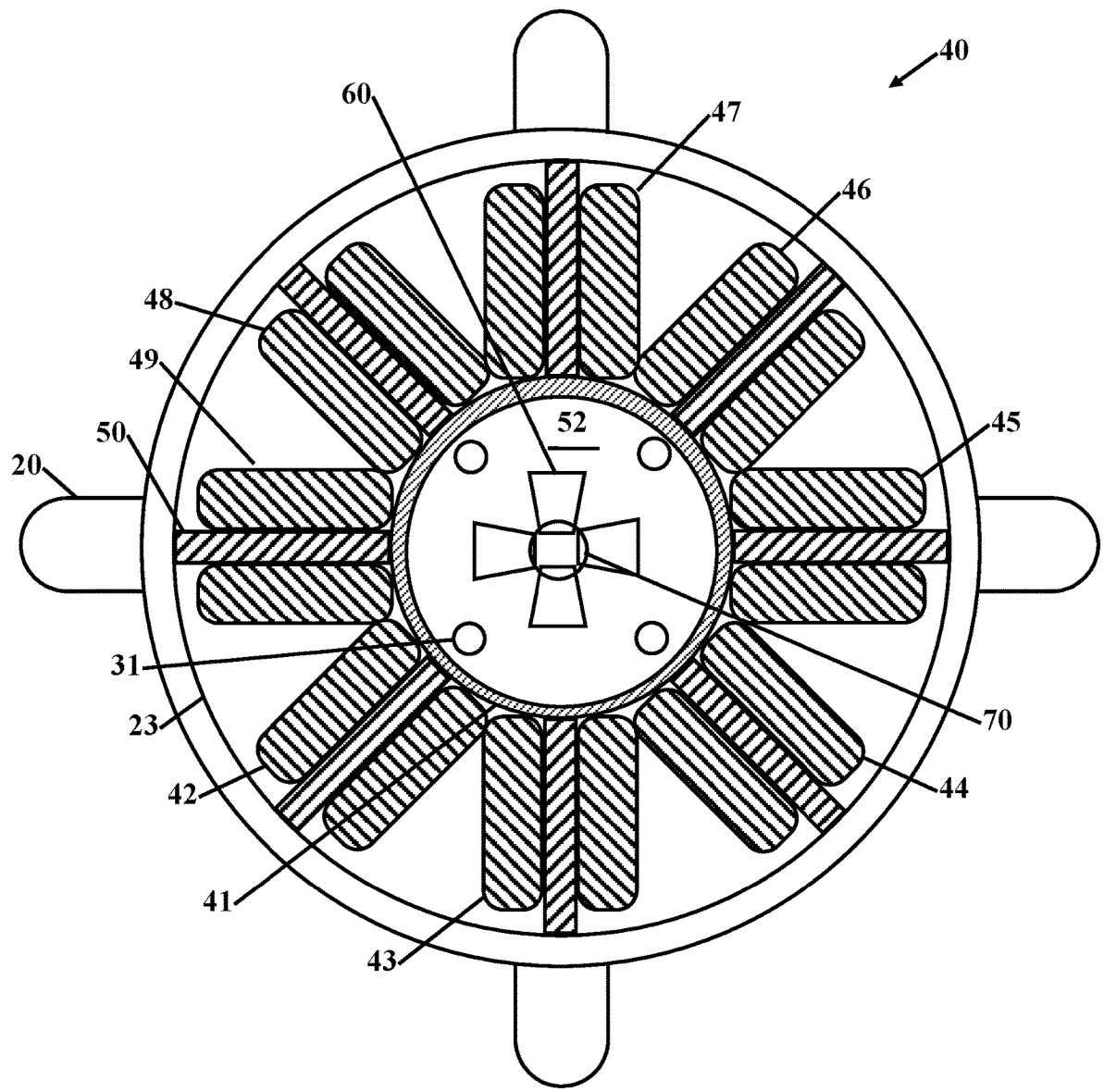
FIG. 3 shows a top-down sectional view of the extraction chamber.

FIG. 3 shows a top-down sectional view of the extraction chamber 40. The extraction chamber 40 is shown on the lower housing 23 on the legs 20. The 8 electromagnetic coils 42, 43, 44, 45, 46, 47, 48 and 49 spaced around the central tank 52. The top of the rigid pipe(s) or tubes 31 are shown extending into the inside of the tank 52. While the coils 42-49 are shown arranged around the tank 52, one or more electromagnetic coils can be placed within the tank 52. Within the tank 52 the actuator 70 can be used to pressurize or disturb the brine/sorbent mixture. Within the tank 52 is also shown a mixing blade 60 that can also be used to disturb the brine/sorbent in a static, DC or zero Hz field of the electromagnet.

The coils 42-49 can be energized in several different methods to alter the magnetic fields within the tank 52. The magnetic field can be pulsed with square waves, sine waves, triangular waves, or other wave shapes with frequencies from below 1 Hz to frequencies up to 100 THz. The higher frequencies are limited by the inductance value of the coils. Using coils with small inductance or an antenna the frequencies can be increased to K Hz, M Hz, G Hz or THz.

Figures 4A, 4B:
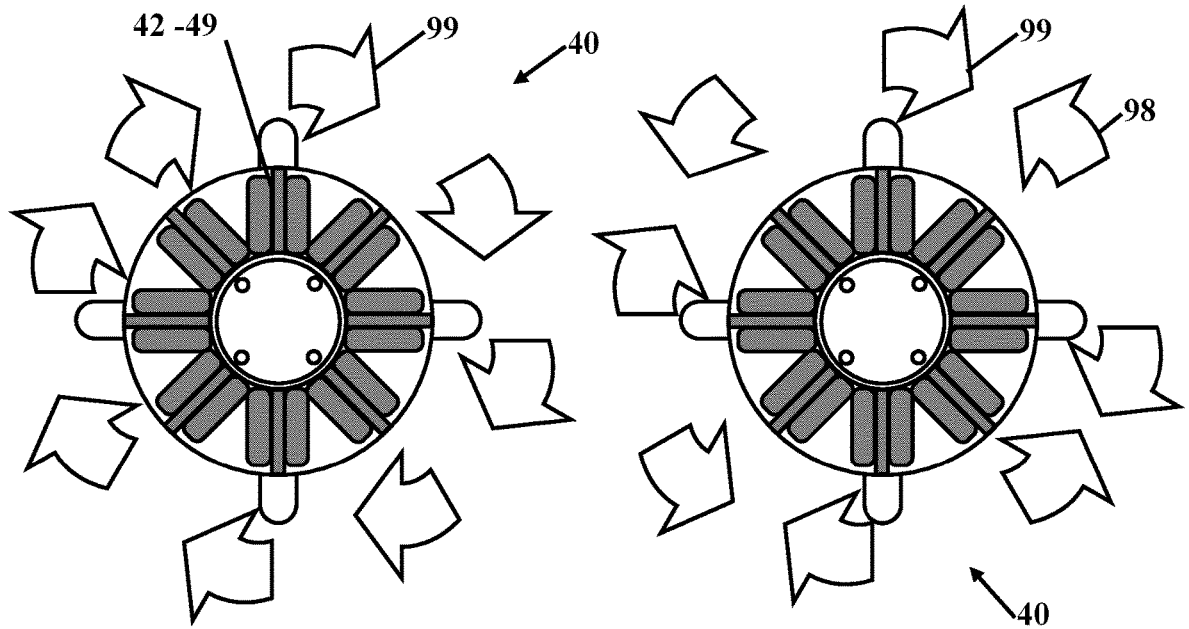
FIGS. 4A and 4B show some preferred phasing of the coils for extracting lithium ions.
Figures 5A, 5B:
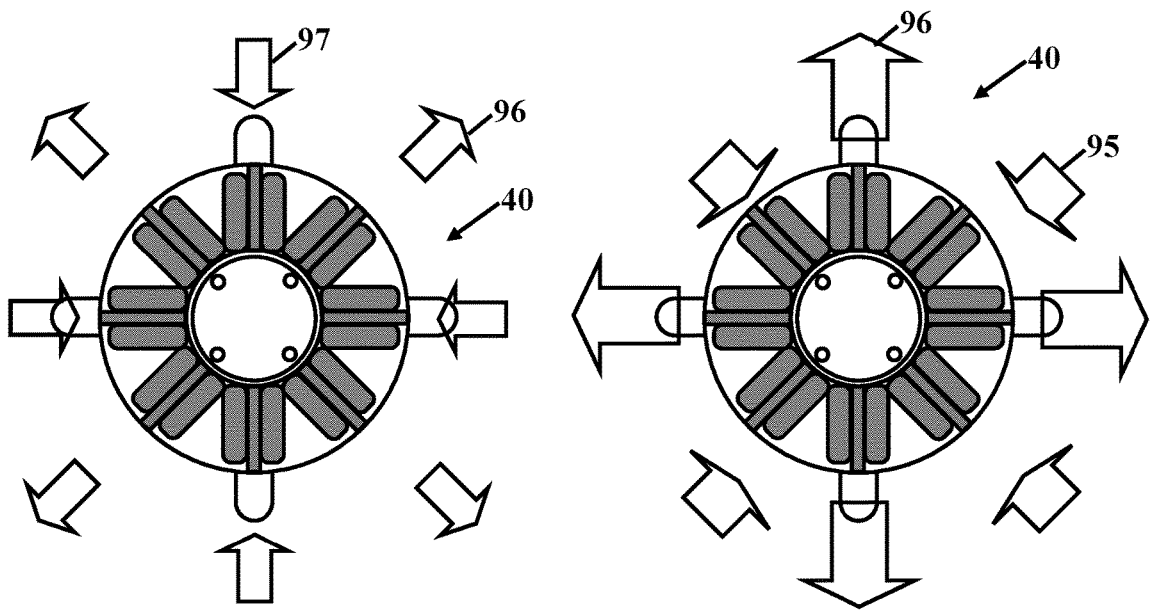
FIGS. 5A and 5B show some additional preferred phasing of the coils for extracting lithium ions.

FIGS. 4A and 4B show some preferred phasing of the coils for extracting lithium-ion in the extraction chamber 40 and FIGS. 5A and 5B show some additional preferred phasing of the coils for extracting lithium-ion in the extraction chamber 40. These images show the eight coils 42-49 where the energizing can take place in different ways. The eight coils 42-49 can be collectively energized and de-energized as a square wave, sine wave or other wave shape at different frequencies from DC to a frequency of 100 THz or higher. The frequency increases the collection of lithium-ion into the sorbent as the polarity of the sorbent changes with the energizing of the eight coils 42-49. With a DC or static field, the sorbent moves in an induction effect, or within a Faraday type cage with no magnetic frequency.

In FIG. 4A the eight coils 42-49 are energized in a rotary oscillation around the extraction chamber. In FIG. 4B the eight coils 42-49 are energized in back-and-forth washing machine type energizing rotation 98 and oscillation 99. In FIG. 5A opposing eight coils 42-49 are energized in opposite polarity of outward and inward energizing. In FIG. 5B the eight coils 42-49 are shown with four strong outward 96 and weak 95 energized four coils 42-49. While these are examples of energizing the eight coils 42-49 to increase lithium-ion extraction future testing will provide an optimal frequency and coil energizing to increase the production of lithium-ion absorption into sorbent material.

Other embodiments can alter the pressure within the extraction chamber. In addition to altering the pressure within the extraction chamber 40 different frequencies and sound, temperature, and light can be induced into the extraction chamber 40 to effect extraction of the lithium-ion into sorbent.

Figure 6:
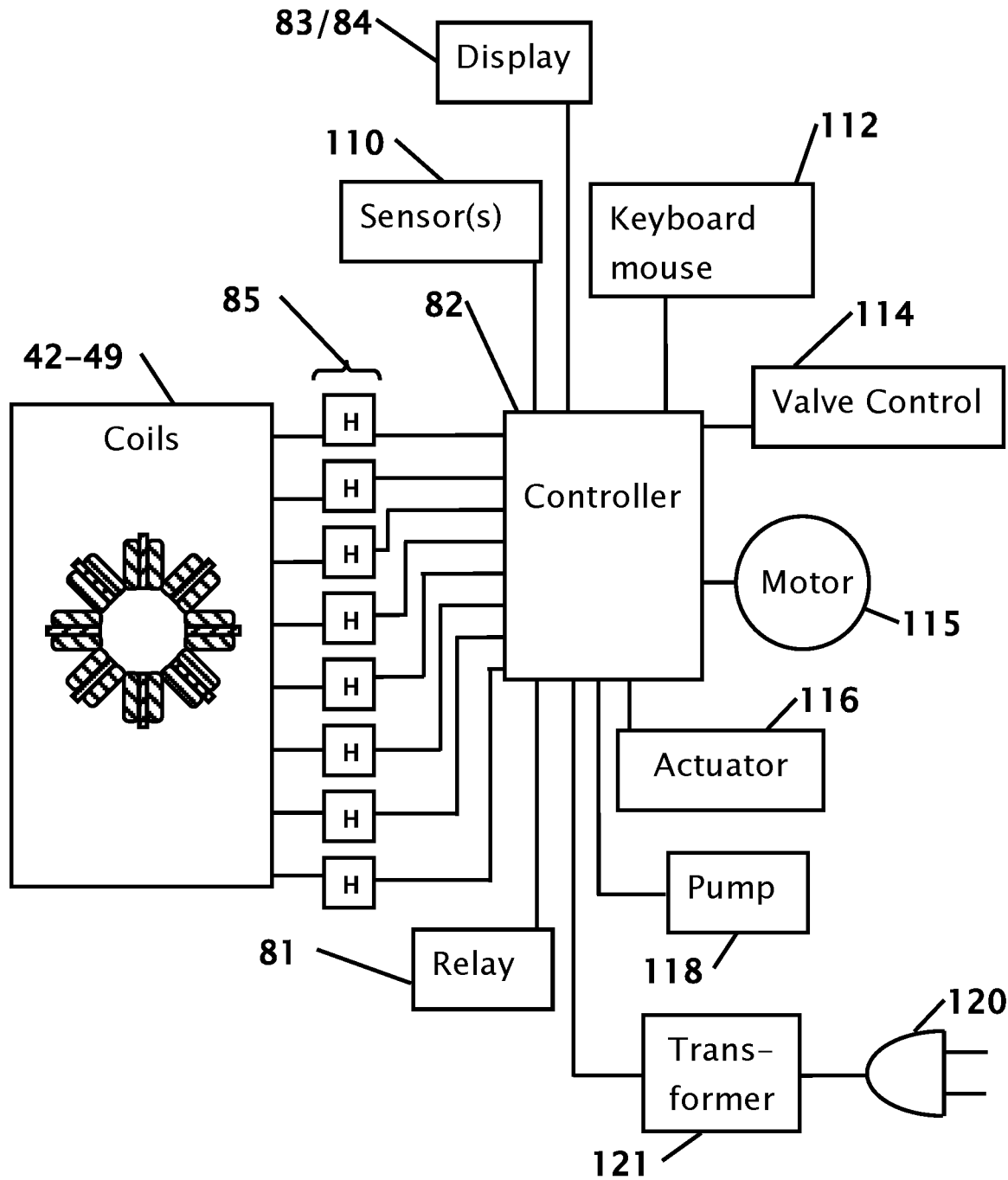
FIG. 6 shows a block diagram of the support components of the lithium extractor ions.

FIG. 6 shows a block diagram of the support components of the lithium-ion extractor 10. The lithium-ion extractor 10 is powered by a plug-in 120 power supply that is connected to a transformer 121 that conditions the power to the lithium-ion extractor 10. The power to the coils 42-49 is under the control of a controller 82 that command the control of power to the coils through separate relays, SCRs, or H-bridges 85 for both the polarity and the magnetic field strength. Multiple sensors 110 monitor the operation and control the parameters with the extraction chamber. One or more displays 83 and 84 allow for a user to view real-time performance of the lithium-ion extractor 10. The controller 82 is also connected to several support components like a keyboard/mouse 112. One or several relays 81, valve controls 114, motor 115, actuator 116 and the like control flow from a pump 118, in and out of the lithium-ion extraction chamber.

Thus, specific embodiments of an improved lithium-ion extraction apparatus have been disclosed. It should be apparent, however, to those skilled in the art that many more modifications besides those described are possible without departing from the inventive concepts herein. The inventive subject matter, therefore, is not to be restricted except in the spirit of the appended claims.

The invention claimed is:

1. A lithium-ion extraction apparatus comprising:
   an extraction chamber containing a mixture of brine containing lithium-ions and a sorbent;
   said extraction chamber is surrounded by at least one electromagnetic coil;
   said at least one electromagnetic coil is connected to a controller that is configured to energize and/or de-energize said at least one electromagnetic coil and,
   said energizing and/or de-energizing of said at least one electromagnetic coil brings orbiting electrons in said sorbent to an elevated state and back to a ground state, cycling, thereby increasing absorption of said lithium-ion into said sorbent.

2. The lithium-ion extraction apparatus according to claim 1, wherein said energizing and/or de-energizing is at a frequency not more than 100 THz.

3. The lithium-ion extraction apparatus according to claim 1, wherein there are at least eight electromagnetic coils.

4. The lithium-ion extraction apparatus according to claim 3, wherein each of said at least eight electromagnetic coils is separately energized.

5. The lithium-ion extraction apparatus according to claim 4, wherein each of said at least eight electromagnetic coils is powered through an H-bridge power supply and controls both the polarity and the magnetic field strength.

6. The lithium-ion extraction apparatus according to claim 3, wherein said at least eight electromagnetic coils create an electromagnetic field that runs parallel with the flow of said brine.

7. The lithium-ion extraction apparatus according to claim 3, wherein said at least eight electromagnetic coils are energized in opposition to a flow direction and a rate of said brine.

8. The lithium-ion extraction apparatus according to claim 1, wherein said at least one electromagnetic coil is powered to induce changes in said sorbent to increase absorption of lithium-ions.

9. The lithium-ion extraction apparatus according to claim 1, wherein said sorbent is a polymer.

10. The lithium-ion extraction apparatus according to claim 9, wherein said sorbent is in a form of porous beads, porous grains, or porous rice.

11. The lithium-ion extraction apparatus according to claim 9, wherein said sorbent is a graft polymer.

12. The lithium-ion extraction apparatus according to claim 1, wherein said sorbent is selected from the group consisting of a cross-linked polystyrene polymer, a lithium manganese oxide, a spinel lithium titanium oxide, and a lithium aluminum layered double hydroxide chloride.

13. The lithium-ion extraction apparatus according to claim 1, wherein said brine is a solution with a pH of between pH 4 and pH 8.

14. The lithium-ion extraction apparatus according to claim 1, further includes a controller configured to control fluid flow, dwell time, agitation, pressure, and temperature of said brine.

* * * * *